Patented Jan. 20, 1931

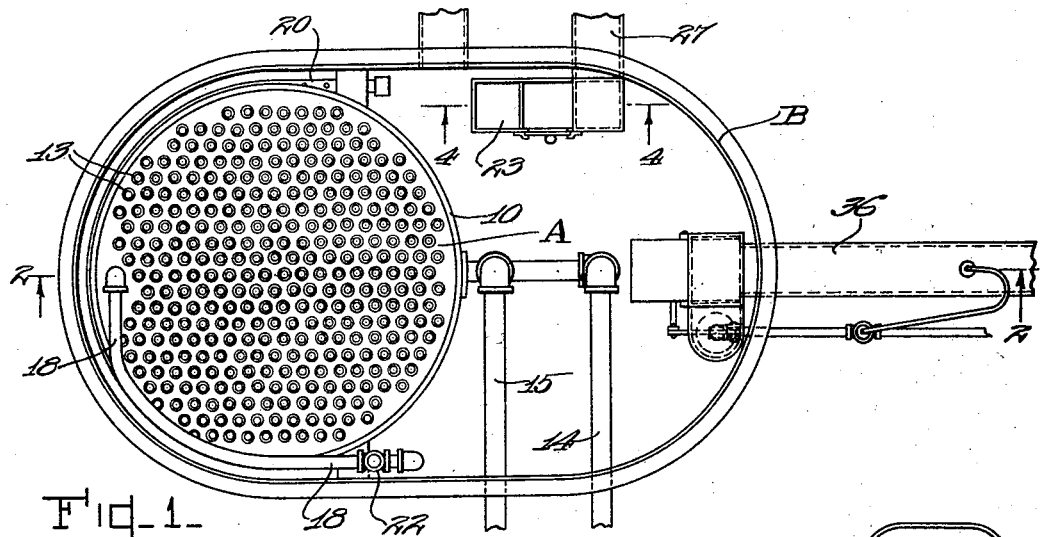
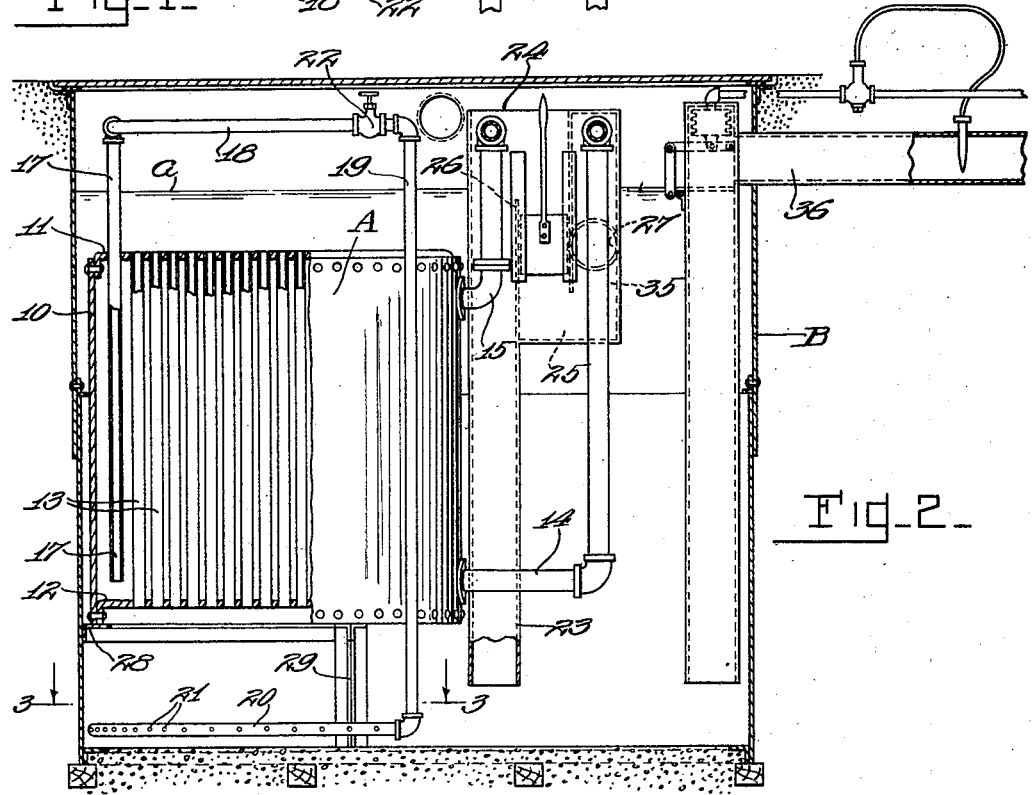

1,789,377

UNITED STATES PATENT OFFICE

FRED S. BOLTZ, OF MANSFIELD, MASSACHUSETTS

SOIL-WATER CATCH BASIN AND HEAT RECLAIMER

Application filed October 20, 1927. Serial No. 227,507.

The invention relates to an apparatus for utilizing the heat of a fluid which has already been heated and used and which usually is allowed to run to waste, such as water which has performed its function in a laundry, dye house, wool scouring plant or elsewhere. The present invention is substantially a division of an application filed by me February 17, 1926, Serial No. 88,908. Apparatus embodying the invention comprises a catch basin for the hot soil water and a heat transfer element which in preferred form consists of a shell having tube sheets at its opposite ends and tubes extending through the shell connected with said sheets, said tubes being open at their ends to the soil water in the catch basin in combination with means for introducing fresh cold water into the shell so that the clean water comes in contact with the hot soil water tubes and is heated thereby and then is delivered to wherever the fresh clean water thus heated is to be used.

When large quantities of clean water are passed through the waste water heat extractor small particles of solid and vegetable matter will collect and accumulate inside of the shell and also around the tubes and form a deposit thereon which in a measure insulates the waste water tubes and lessens the degree of heat transfer from the hot soil water to the fresh cold water in the shell. One object of the present invention is to provide means by which the pressure of fresh water flowing into and out of the shell may be utilized to blow out the sediment collecting in the shell.

The used warm water from which the heat is to be reclaimed usually contains a quantity of lint, small pieces of cloth, paper, grease and other solid matter. As the circulation of the warm waste water is downward through the tubes of the heat extractor these solid particles are deposited in the bottom of the soil water basin in which the heat extractor is suspended or supported and in time they build up to quite an amount within the basin and prevent or at least retard the circulation of the warm waste water through the tubes. One object of the present invention is to provide means by which the pressure of fresh water flowing into and out of the shell may be utilized to blow out the sediment collecting in the bottom of the catch basin.

The invention will be fully understood from the following description when taken in connection with the accompanying drawings and the novel features thereof will be pointed out and clearly defined in the claims at the close of this specification.

In the drawings:

Fig. 1 is a plan view of one form of apparatus embodying the invention with the cover of the catch basin removed.

Figure 2 is a vertical section through the catch basin taken on the line 2—2 of Fig. 1.

Figure 3:
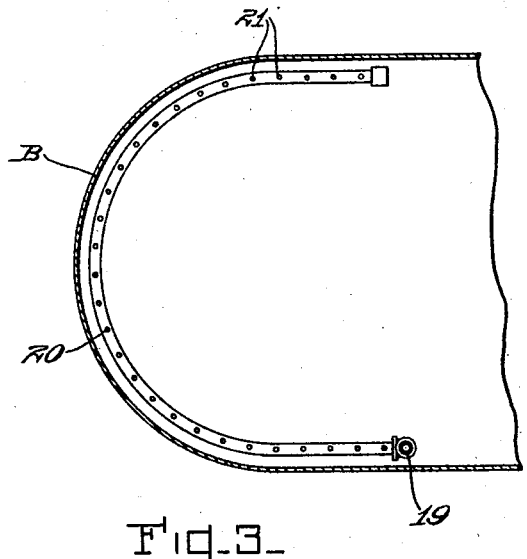
Fig. 3 is a section on line 3—3 of Fig. 2.
Figure 4:
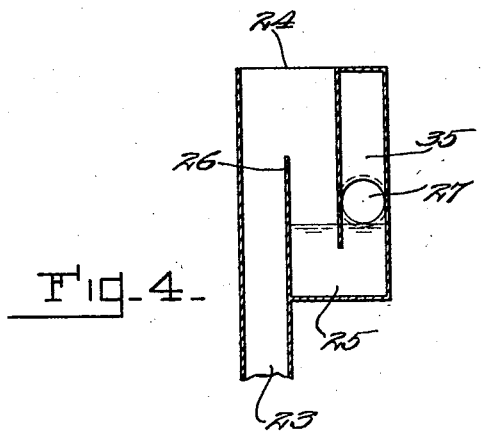
Fig. 4 is a section on line 4—4 of Fig. 1.

Referring to the drawings, there is shown at A a heating apparatus consisting of a hollow cylindrical shell 10 having tube sheets 11, 12 at its upper and lower ends respectively and tubes 13 extending through the shell and connected with the tube sheets, the said tubes being open at each end to the interior of the catch basin B in which it is set.

The hot soil water from the catch basin will enter the tubes 13 at their upper ends, it being assumed that the hot soil water in the basin will be of sufficient depth so that the upper surface of the soil water will be above the tops of the tubes.

An inlet pipe 14 for the fresh water which is to be heated enters the shell 10 through an inlet aperture in the wall of the shell near the lower end thereof just above the lower tube sheet and discharges into said shell. The clean water thus introduced will circulate around the tubes and pass upward to the fresh water outlet 15 through the side wall of the shell just below the upper tube sheet 11. The fresh water will be heated by contact with the hot tubes as the water passes up through the shell and circulates around the tubes.

The fresh water inlet 14 is connected with a suitable source having a head pressure, preferably being connected with the city water supply so that sufficient pressure will act on the water in the shell to force it upward from the lower part of the shell. The outlet pipe 15 for the fresh water conveys the heated fresh water to any place where it is desired to be utilized.

The hot soil water enters the basin through pipe 36.

The hot soil water will be cooled by coming in contact with the cold fresh water pipes and will settle to the bottom of the basin. A soil water overflow pipe 23 is provided through which the cooled soil water settling to the bottom will be carried from the lower part of the catch basin upward to the upper part of the catch basin at a point higher than the top of the shell and thence be discharged to the sewer or other suitable place of discharge. This overflow pipe 23 is open at its lower end to the soil water in the lower part of the catch basin. Said pipe 23 extends upward within the catch basin outside of the shell 10 to a point somewhat above the normal level of the hot soil water in the catch basin. The normal level of the soil water is shown at $a$ and the upper end of the overflow pipe is shown at 24. Projecting from one side of the overflow pipe near the upper end thereof is a chamber 25 which forms an enlargement of the upper portion of said pipe 23, said chamber having a closed bottom. A vertical partition or baffle 26 separates said chamber from the body of the pipe 23, said partition extending up to about the normal level of the waste water, but not to the full height of the said pipe 23. The partition 26 may be the upper portion of one side wall of the overflow pipe. This baffle plate forms a dam or weir over which the waste water as it rises in the overflow pipe can flow into said chamber 25. Said chamber has an upward bend or extension 35. An outlet pipe 27 leads from said chamber extension 35 to carry the cooled soil water to the sewer or other discharge point.

The shell 10 may be supported in any suitable way within the catch basin so that the bottom of the shell will be some distance above the bottom of the catch basin and the top of the shell will be some distance below the normal water level of the waste water. As shown in the drawings the wall of the catch basin which is oval in cross section has secured thereto an angle plate or bracket 28 extending part way around the basin on which a portion of the heat reclaimer shell rests and there are provided upright supports 29 which extend upward from the bottom of the basin to also aid in supporting the heat reclaimer shell.

The blow off apparatus for cleaning the soil water inlet tubes 13 within the shell and for cleaning the bottom of the shell and also for blowing out the sediment and other accumulations from the bottom of the catch basin is as follows:

A blow off pipe 17 whose lower end is open to the interior of the shell near the bottom tube sheet 12 extends up through the upper tube sheet to some distance above the normal level of the waste water in the basin as well as above the top of the heat reclaimer shell and is connected with a pipe 18 which extends in a substantially horizontal plane part way around the inner periphery of the basin as shown in Fig. 1 and is connected with a pipe 19 which extends down outside of the shell but within the basin to a point below the lower end of the shell. It is there connected with a pipe 20 which is preferably curved to follow the curved wall of the basin nearly to a point below the open lower end of the overflow pipe 23 and is formed with a series of apertures 21.

Any solid matter carried into the heat extractor shell by the water entering through the fresh water inlet pipe 14 will tend to lodge in the bottom of the heat extractor shell, that is on the bottom tube sheet, and the accumulation will be mainly on the opposite side of the shell from the inlet opening. For this reason the upright portion of the pipe 17 is located on the opposite side of the heat extractor shell from the cold water inlet pipe 14.

A blow off valve 22 is connected with the horizontal run of the pipe 18 in the upper part of the basin. This blow off valve is usually kept closed except when it is desired to blow off the sediment and deposit which collects in the basin and shell and in the tubes. By opening the blow off valve 22 the pressure of the incoming cold water through the inlet pipe 14 due to the pressure in the city system will set up a rapid current from the mouth of the inlet pipe 14 through the shell 10 to the open lower end of pipe 17, thence up through the pipe 17, thence through the extension pipes 18, 19 and 20, and through the apertures 21, thence toward the open lower end of the overflow pipe. The current of water passing through the shell will stir up the water throughout the shell and drive the sediment toward the open lower end of pipe 17 and also clean off the deposit on the outer walls of the tubes 13 and carry the sediment with the water up through the tube 17, thence through the crossover portion 18 and thence down through the pipe 19 to the pipe 20 in the lower part of the basin and out through the apertures 21 in the pipe 20 into the catch basin. This will set up a current toward the open lower end of the overflow pipe. The current which is set up by the pressure up through pipe 17, thence through pipe 18, down through the pipe 19 and out through the apertures 21 will entrain the lint and other solid particles which have collected in the lower part of the catch basin and sweep them over toward the open lower end of the overflow pipe 23 and thence carry them up through the overflow pipe whence they will drop down into the chamber 25 and pass out through the outlet 27 to the sewer.

By reason of the bottom flushing pipe 20 being connected with the sediment blow off pipe 17 from the heat extractor, the single blow off valve 22 controls the two functions of flushing the dirt out of the heat extractor and of flushing the lint and other solid matter which collects under the heat extractor out of the catch basin.

Instead of utilizing water pressure through the blow-off pipe to force the waste water toward the overflow pipe, any other fluid pressure, liquid or gas, may be introduced into the catch basin to the same effect and come within the scope of my invention.

What I claim is:

1. An apparatus of the character described comprising a vertical tubular shell having tube sheets at its ends and a plurality of tubes connecting said sheets, the tubes being open at their ends to soil water, a soil water catch basin in which said shell is mounted in such manner that the tubes are open at each end to the soil water within the basin and means for introducing fresh water under pressure into the said shell into contact with the soil water tubes and thence out of said shell, an overflow pipe in said catch basin which extends down into the lower part of said basin and is open at its lower end, the upper part of said overflow pipe having communication with a discharge outlet to a point outside of the basin, a blow-off pipe which extends into the interior of said shell and is open to the interior of the shell, the other end of said blow-off pipe extending outside of said shell and being open to the soil water in the lower part of said catch basin, a valve in said blow-off pipe whereby when the valve is open the pressure of the inflowing fresh water on the water in the interior of the shell is adapted to force the water and sediment in the interior of the shell through the blow-off pipe down into the lower part of the catch basin and to force the water in the lower part of the catch basin and the entrained contents up through the said overflow pipe and out through said discharge outlet.

2. An apparatus of the character described comprising a soil water catch basin, a shell mounted in said catch basin, said shell having tube sheets at its ends and a plurality of tubes connecting said sheets, said tubes being open at their ends to the soil water in the catch basin, means for introducing clean water under pressure into said shell and into contact with the outer walls of said tubes within the shell, a flush pipe extending from the lower part of said shell to a point outside of said shell, and being open at one end to the interior of said shell near the lower end of the shell, at a point substantially opposite the inlet opening for the clean water pipe, the other end of said flush pipe having a discharge outlet outside of said shell, the pressure of the clean water entering said shell being adapted to flush the interior of the shell and the outer walls of said tubes and force the water with the entrained contents up through said flush pipe to the discharge outlet therefrom.

3. An apparatus of the character described comprising a soil water catch basin, a shell mounted in said catch basin, said shell having tube sheets at its ends and a plurality of tubes connecting said sheets, the tubes being open at their ends to the soil water in the catch basin, means for introducing clean water into said shell and into contact with said tubes, an overflow pipe leading from the lower part of said catch basin to the upper part thereof, a discharge passage from said overflow pipe to a point outside of the catch basin and means for causing a current of fresh water to be distributed under pressure in the lower part of said catch basin and adapted to force the soil water and entrained contents in the lower part of the catch basin into and through said overflow pipe.

4. An apparatus of the character described comprising a soil water catch basin, a shell mounted in said catch basin having tube sheets at its ends and a plurality of tubes connecting said sheets, the tubes being open at their ends to the soil water in the catch basin, an overflow pipe leading from the lower part of the catch basin into the upper part thereof, a discharge passage from said overflow pipe to a point outside of the catch basin, a pipe for introducing clean water under pressure into the lower part of said shell and into contact with said tubes, a blow-off pipe extending from the interior of the shell through the wall thereof into the lower part of the catch basin, one end of said blow-off pipe being open to the clean water in the shell and the other end of the blow-off pipe having a portion adjacent the wall of the catch basin formed with apertures through which the clean water is discharged into the catch basin, the pressure of the clean water coming into the shell and thence through the blowoff pipe being adapted to force the soil water and entrained contents in the lower part of the catch basin toward said overflow pipe.

5. An apparatus of the character described comprising a soil water catch basin, a clean water shell mounted in said catch basin constructed and arranged to prevent the mingling of the soil water with the fresh water in the shell, a pipe for introducing clean water under pressure into said shell, a pipe leading from the lower part of said catch basin to the upper part thereof and having a discharge to a point outside of said catch basin, a blow-off pipe open at one end to the clean water introduced into the shell under pressure, and opening at its other end into the catch basin, the pressure of the clean water flowing through the blow-off pipe into the waste water basin being adapted to force the waste water and entrained contents toward the entrance to said waste water discharge pipe.

6. An apparatus of the character described comprising a catch basin for hot soil water, a clean water chamber enclosed in said catch basin so constructed and arranged as to prevent the mingling of the soil water with the clean water, a discharge conduit leading from the lower part of said catch basin toward the upper part thereof and having a discharge outlet to a point outside of said catch basin, a blow-off pipe communicating with the interior of said clean water shell and discharging into said basin, a source of fluid pressure communicating with said blow-off pipe, and means for causing fluid under pressure to pass through the blow-off pipe into said waste water basin and thereby force the waste water and entrained contents into said discharge conduit.

7. An apparatus of the character described comprising a soil water catch basin, a clean water shell mounted in said catch basin constructed and arranged to prevent the mingling of the soil water in the basin with the fresh water in the shell, means for introducing clean water into said shell, a conduit leading from the lower part of said catch basin to the upper part thereof and having a discharge outlet at a point outside of said catch basin, a blow-off pipe which extends from the interior of the fresh water shell through the wall of said shell into the lower part of the waste water basin, said blow-off pipe having an inlet thereto from the clean water shell and an outlet into the lower part of the waste water basin, and means for causing fluid under pressure to pass into said blow-off pipe and thence into the waste water basin whereby said pressure is adapted to force the waste water and entrained contents into said waste water discharge conduit.

8. An apparatus of the character described comprising a soil water catch basin, a clean water shell mounted in said catch basin constructed and arranged to prevent the mingling of the soil water in the basis with the fresh water in the shell, means for introducing clean water into said shell, a conduit leading from the lower part of said catch basin to the upper part thereof and having a discharge passage to a point outside of said catch basin, a blow-off pipe extending from the interior of the fresh water shell into the upper part of the catch basin, thence down into the lower part of said catch basin, and means for causing fluid under pressure to pass through the blow-off pipe into the waste water basin whereby said pressure is adapted to force the sediment in the clean water shell and the waste water and entrained contents in the catch basin into said waste water discharge conduit.

9. Apparatus of the character described comprising a catch basin for hot waste water, a heat interchanger for clean water located within the basin so constructed and arranged as to prevent the mingling of the waste water with the clean water, a discharge pipe leading from the lower part of the waste water basin upwards and through the wall thereof to a point outside the basin and means for introducing fluid under pressure into the lower part of said basin adapted to force the water and sediment from the lower part of said basin into and through said discharge pipe to a point outside of the basin.

In testimony whereof I affix my signature.

FRED S. BOLTZ.